US008475076B2

(12) United States Patent
Yamashita

(10) Patent No.: US 8,475,076 B2
(45) Date of Patent: Jul. 2, 2013

(54) SOCKET WRENCH

(75) Inventor: Daisuke Yamashita, Kakegawa (JP)

(73) Assignee: Ko-Ken Tool Co., Ltd., Kakegawa, Shizuoka-Pref. (JP)

( * ) Notice: Subject to any disclaimer, the term of this patent is extended or adjusted under 35 U.S.C. 154(b) by 186 days.

(21) Appl. No.: 12/805,601

(22) Filed: Aug. 9, 2010

(65) Prior Publication Data

US 2011/0146461 A1 Jun. 23, 2011

(30) Foreign Application Priority Data

Dec. 18, 2009 (JP) ................................ 2009-287463

(51) Int. Cl.
*F16B 21/00* (2006.01)

(52) U.S. Cl.
USPC ....................... 403/322.2; 81/121.1; 81/124.3

(58) Field of Classification Search
USPC .......... 81/177.85, 121.1, 124.6, 124.3, 124.4, 81/125.1, 60–63.2, 177.9; 403/322.2
See application file for complete search history.

(56) References Cited

U.S. PATENT DOCUMENTS

| | | | | |
|---|---|---|---|---|
| 1,392,220 | A * | 9/1921 | Quint | 81/177.75 |
| 2,162,359 | A * | 6/1939 | Rhinevault | 403/328 |
| 2,701,977 | A * | 2/1955 | Stone | 81/63.2 |
| 4,420,995 | A * | 12/1983 | Roberts | 81/60 |
| 4,485,700 | A * | 12/1984 | Colvin | 81/62 |
| 6,109,140 | A * | 8/2000 | Roberts et al. | 81/63 |
| 6,823,762 | B2 * | 11/2004 | Hu | 81/177.85 |
| 2007/0163406 | A1 * | 7/2007 | Liu | 81/177.85 |
| 2009/0226248 | A1 * | 9/2009 | Wang | 403/322.2 |

FOREIGN PATENT DOCUMENTS

JP H06-9876 2/1994

* cited by examiner

*Primary Examiner* — Alicia Torres
(74) *Attorney, Agent, or Firm* — Jacobson Holman PLLC

(57) ABSTRACT

A socket wrench in which a supporting hole is formed in a drive disposed at an operating handle, and a steel ball pressed by a coiled spring is movably engaged with the supporting hole. A recess part for allowing the steel ball to partly engage therein is formed in an inner wall of an assembling hole of a wrench body for allowing the drive to engage therein. A connecting hole engageable with a polygonal head part of a bolt to be operated is formed in the wrench body in such a manner as to be coaxial with the drive. The recess part has a pair of contacting walls for the steel ball to contact therewith, the pair of contacting walls being disposed in mutually intersecting directions.

1 Claim, 6 Drawing Sheets

SOCKET WRENCH

FIELD OF THE INVENTION

This invention relates to a socket wrench used for tightening or loosening a nut or a bolt by externally fitting a wrench body to a polygonal head of the nut or the bolt and exerting a driving force of a drive to the wrench body through operation of an operating handle.

BACKGROUND OF THE INVENTION

There is already known a socket wrench comprising an operating handle, a drive having a supporting hole and attached to the operating handle, and a wrench body, a steel ball pressed by a spring being engaged in the supporting hole such that the steel ball can come in and out with respect to the supporting hole, a recess part for allowing the steel ball partly engaged therein being formed in an inner wall of an assembling hole for allowing the drive to engage therein, an engaging square hole being formed in the wrench body in such a manner as to be coaxial with the drive so that the engaging square hole can be engaged with, for example, a polygonal head of a bolt to be operated (for example, Patent Document 1).

A socket wrench shown in Patent Document 1 is of the type in which a separate adapter is assembled to the operating handle and the drive is disposed at the adapter. The present invention is, of course, applicable to the foregoing arrangement. In addition, the present invention is applicable to a socket wrench of the type in which as shown in one preferred embodiment as described later, the adapter is omitted and the drive is directly attached to (the head part of the operating handle.

RELATED ART DOCUMENT

Patent Document 1: Official Gazette of Japanese Utility Model Laid-Open Application No. H06-9876

SUMMARY OF THE INVENTION

Problem to Solve

A socket wrench disclosed by the above-mentioned Patent Document, as shown in FIG. 9, comprises a wrench body 103 having an assembling hole 107. The assembling hole 107 is provided at an inner wall thereof with a recess part 109. The wall surface of the recess part 109 is annular having a radius of curvature larger than that of an annular surface of a steel ball 106.

Accordingly, when the steel ball 106 is brought into engagement with the recess part 109 and contacted with the wall surface of the recess part 109 under the effect of a coiled spring 105 after a drive 102 disposed at a distal end of an operating handle 101 is engaged with the assembling hole 107, the steel ball 106 and the wall surface of the recess part 109 are brought into point-contact with each other. Thus, the steel ball 106 having a spherical body is apt to move along the wall surface of the recess part 109, thus making it unable to obtain a stable engagement between the assembling hole 107 and the drive 102. Thus, a favorable fitness is unobtainable. This naturally exerts an adverse affection to a smooth engaging operation of the wrench body 103 assembled to the drive 102 with respect to a polygonal head part of a bolt to be operated.

It is, therefore, an object of the present invention to provide a socket wrench in which an assembling hole formed in a wrench body can be brought into stable engagement with a drive disposed at an operating handle without rattling, and facilitating a smooth engaging operation of the wrench body with respect to a polygonal head part of a bolt to be operated.

Means to Solve the Problem

In order to achieve the above object, there is provided a socket wrench comprising an operating handle, a drive attached to the operating handle and having a supporting hole, a steel ball pressed by a spring and movably engaged in the supporting hole, and a wrench body having an assembling hole for allowing the drive to engage therein, a recess part for allowing the steel ball to partly engage therein being formed in the assembling hole of the wrench body, a connecting hole engageable with a polygonal head part of a bolt to be operated being formed in the wrench body in such a manner as to be coaxial with the drive, the recess part having a pair of contacting walls for allowing the steel ball to contact, the pair of contacting walls being disposed in mutually intersecting directions.

Effect of the Invention

According to the present invention, when the drive is assembled to the assembling hole, the steel ball held by the drive is reliably engaged with the assembling hole under the biasing force of the coiled spring. Accordingly, the operating handle provided with the drive can reliably be assembled to the wrench body. Since the steel ball pressed by the coiled spring contacts the pair of contacting walls of the recess part of the assembling hole, the steel ball is held at three contacting points including the contacting point with the coiled spring. Thus, the steel ball can be held between the wrench body and the drive in a stable manner. By virtue of the foregoing arrangement, there can be provided a socket wrench in which the wrench body and the drive can stably be assembled together without rattling.

DETAILED DESCRIPTION OF THE EMBODIMENT

Figure 1:
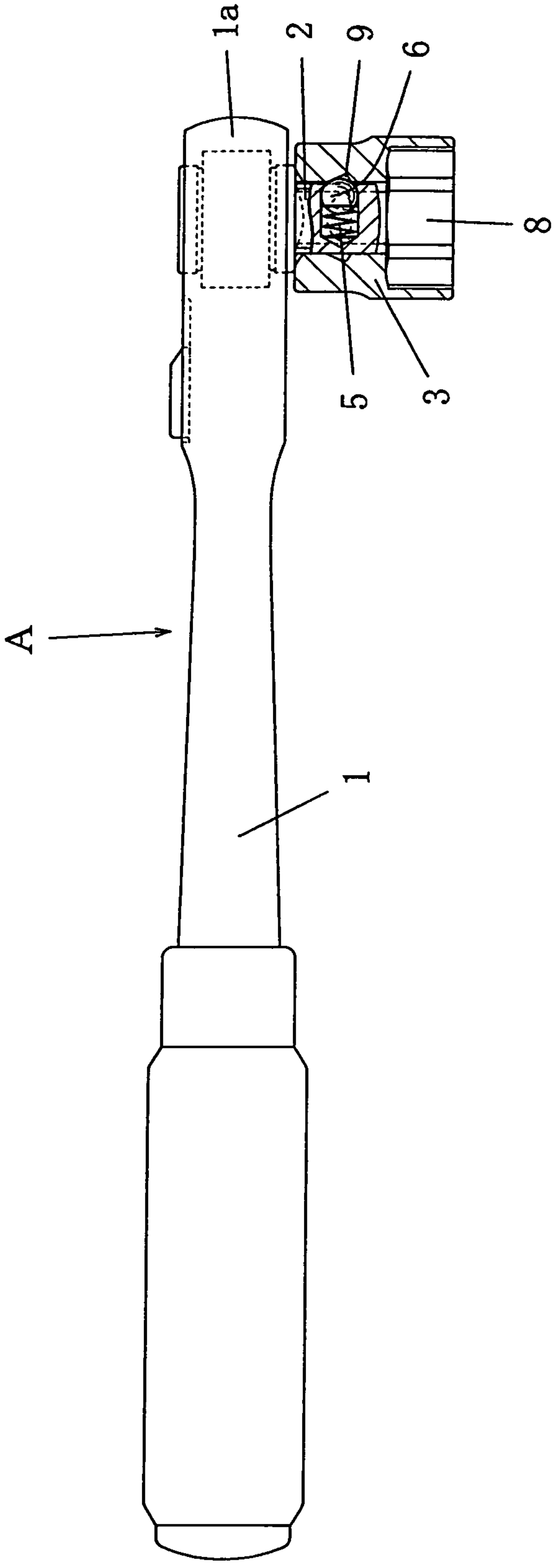
FIG. 1 is a front view, partly cutaway, of one embodiment of the present invention.
Figure 2:
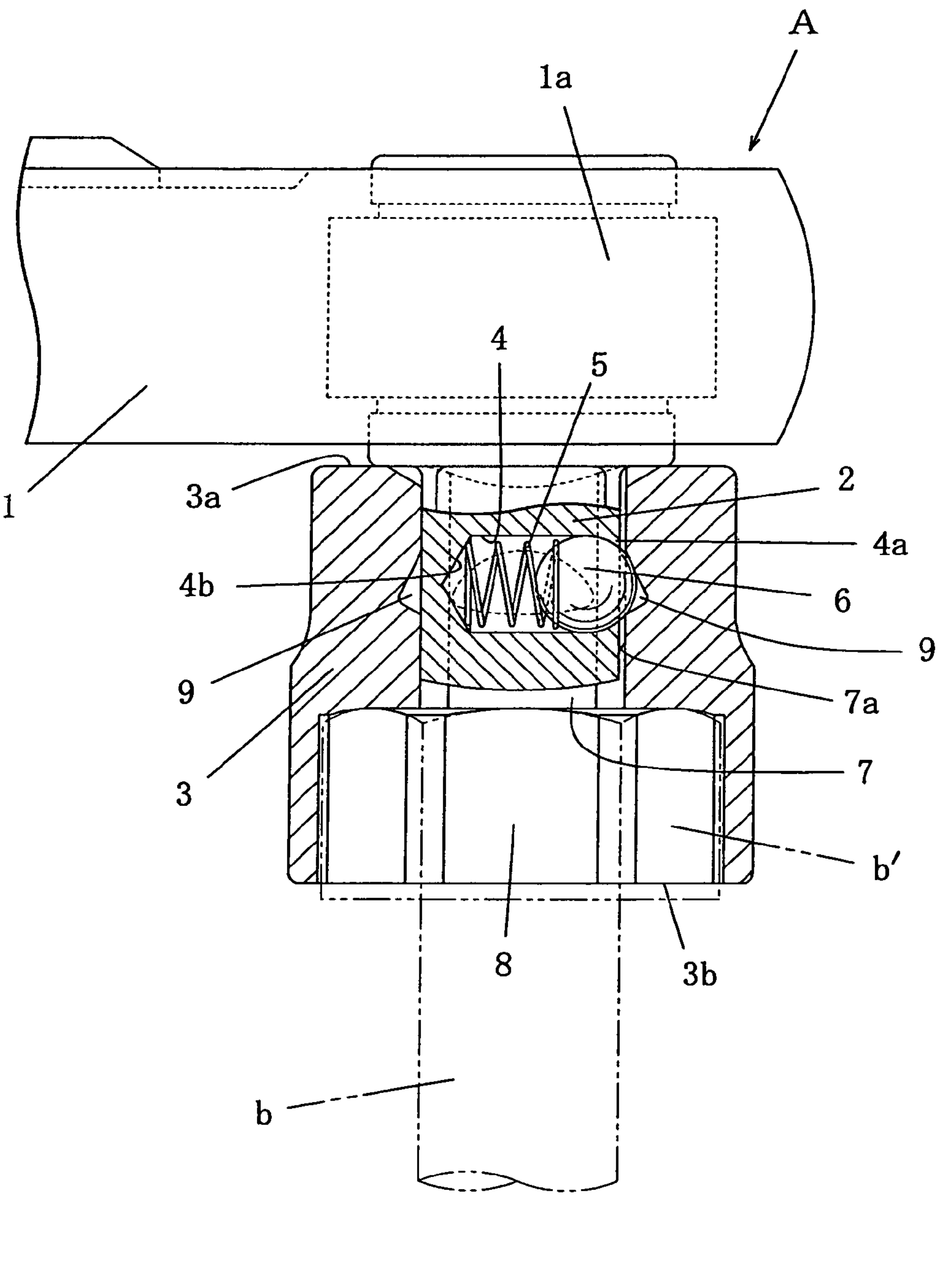
FIG. 2 is a partly enlarged view of FIG. 1.
Figure 3:
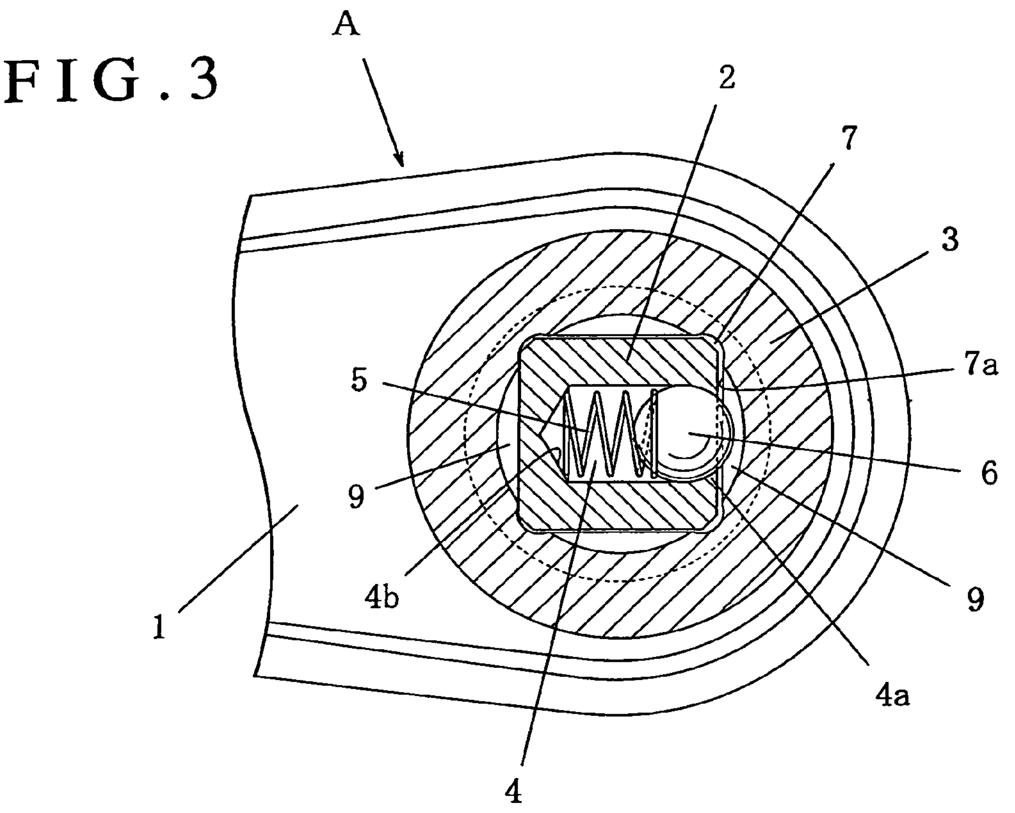
FIG. 3 is a cross sectional view of FIG. 2.
Figure 4:
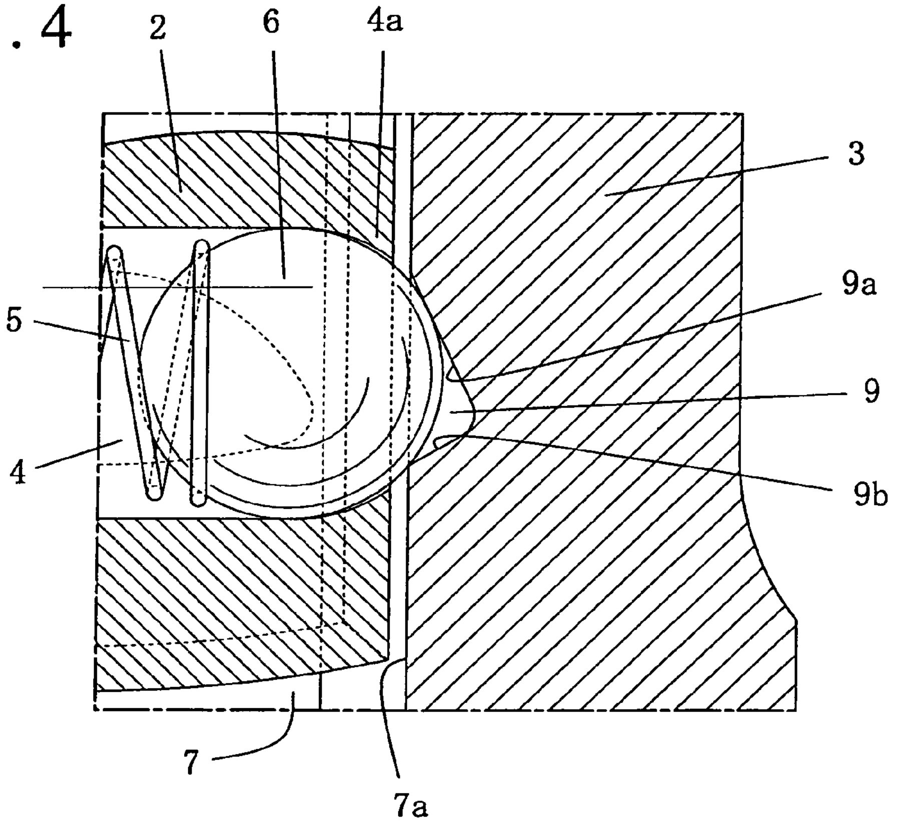
FIG. 4 is a partly enlarged view of FIG. 2.
Figure 5:
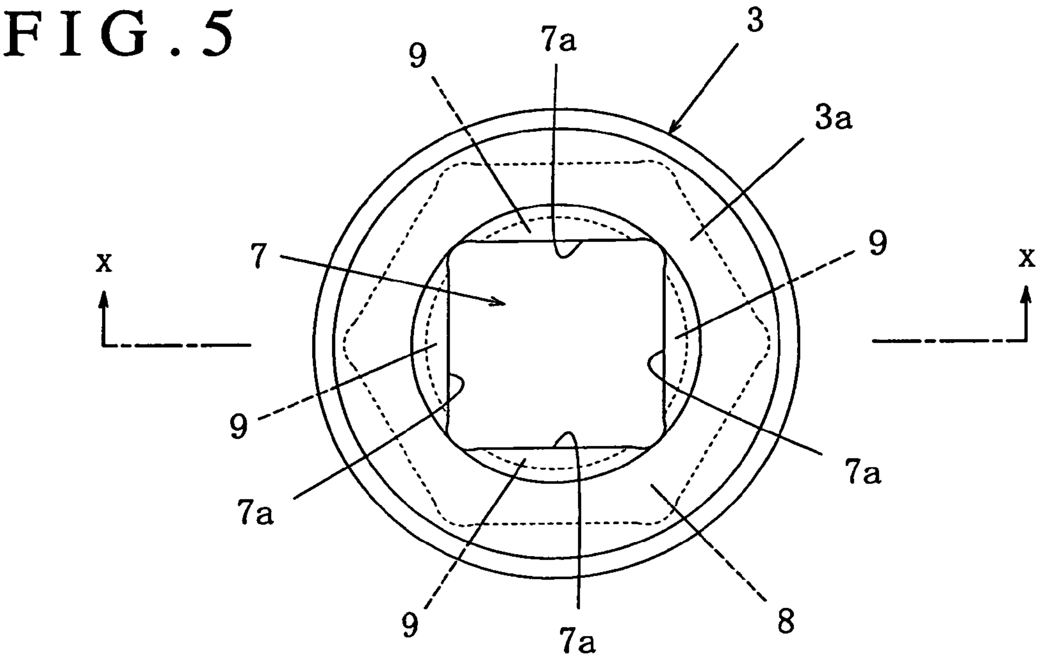
FIG. 5 is a plan view of a wrench body.
Figure 6:
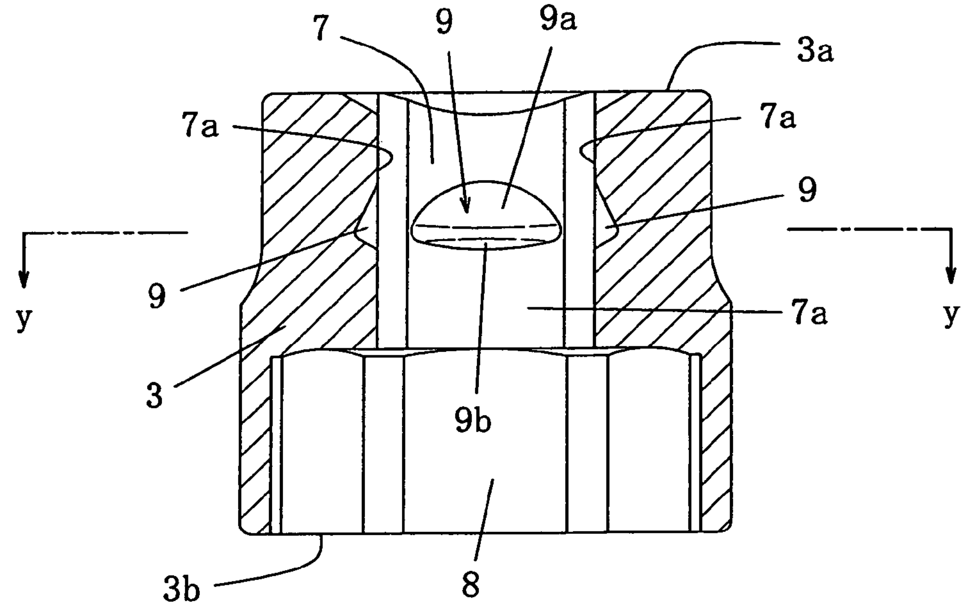
FIG. 6 is a cross sectional view taken on line x-x of FIG. 5.
Figure 7:
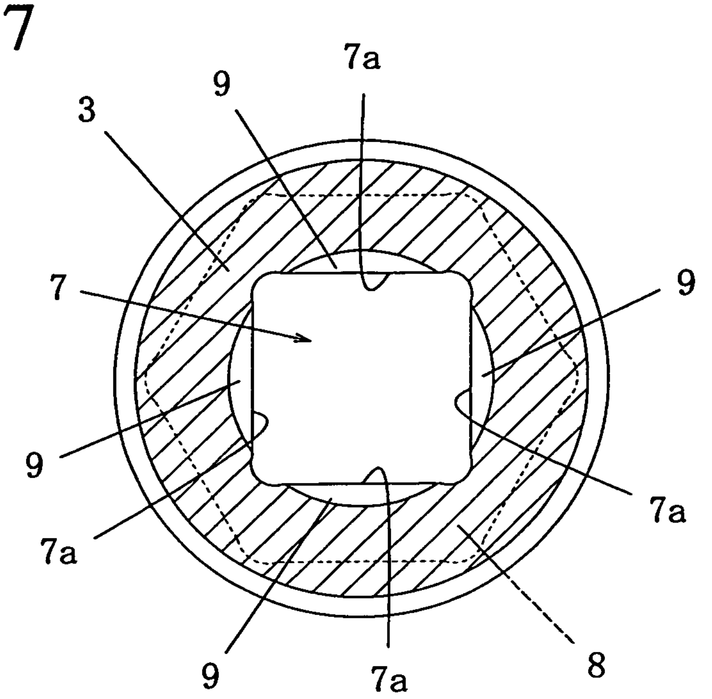
FIG. 7 is a cross sectional view taken on line y-y of FIG. 6.
Figure 8:
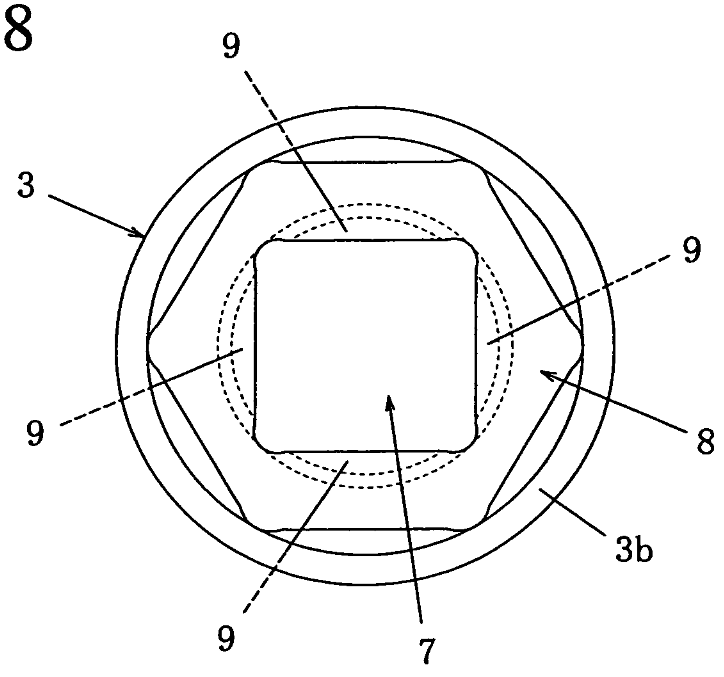
FIG. 8 is a bottom view of the wrench body.
Figure 9:
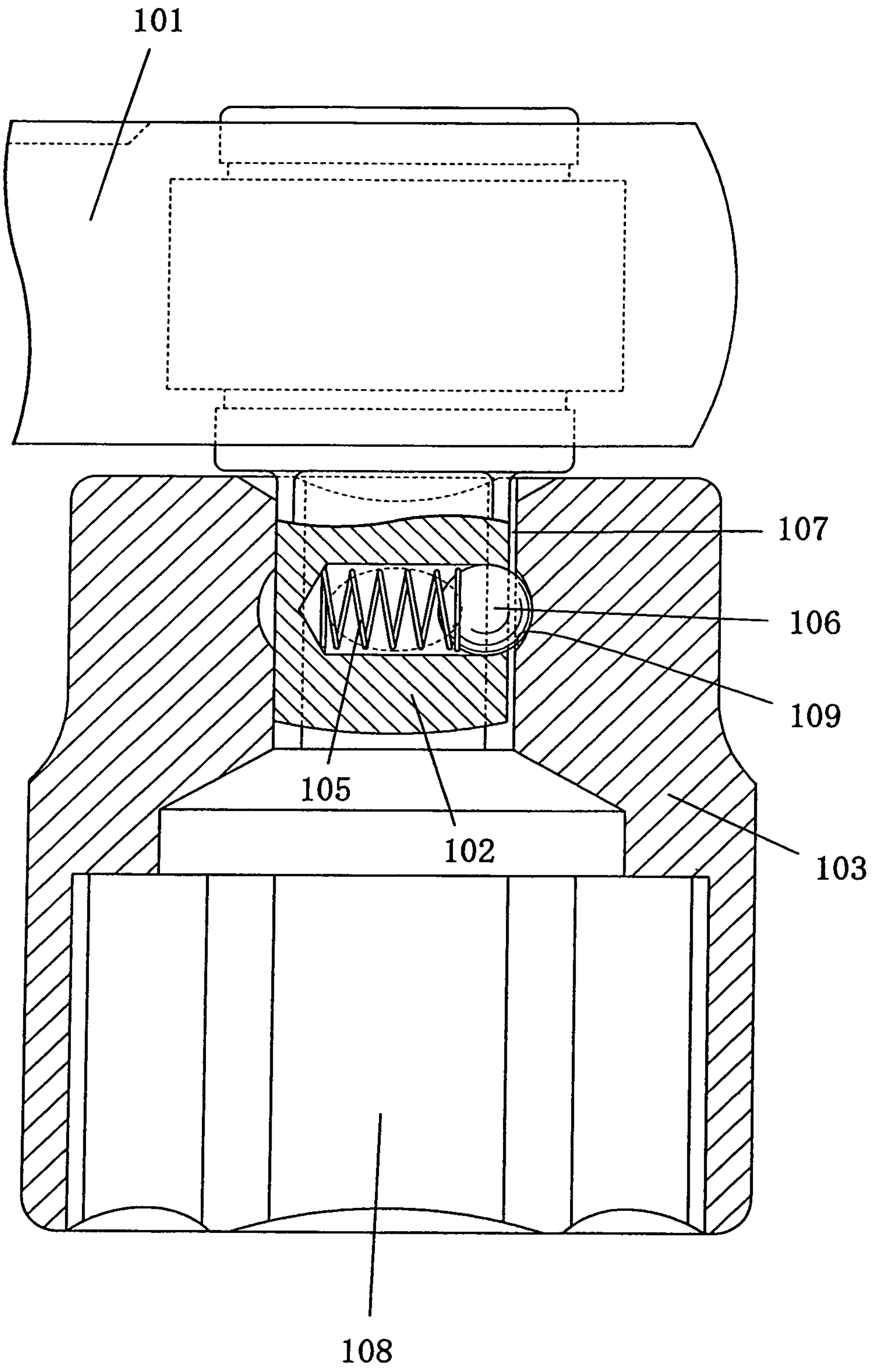
FIG. 9 is a cross sectional view showing a relation between a steel ball and a recess part according to the related art.

One preferred embodiment of a socket wrench according to the present invention will be described with reference to FIGS. 1 through 8. A socket wrench denoted by reference character A comprises an operating handle 1, a drive 2 disposed at a distal end of the operating handle 1 and a wrench body 3 removably attached to the drive 2. The operating handle 1 includes a ratchet mechanism (not shown) which is disposed in its head part 1*a* on its distal end. The operating handle 1 is provided with a drive 2 which is allowed to rotate only in selected one direction, i.e., normal direction or the reverse direction (in other words, either in the clockwise direction or counterclockwise direction) by the ratchet mechanism.

The drive 2 (though the drive of this embodiment has a generally square shape in section, it may take any other shape as long as it can be engaged generally properly with an assembling hole 7, as will be described later, of the wrench body 3 so that a driving force can be given to the wrench body 3) is provided at a peripheral side of an axially intermediate part thereof with a supporting hole 4 which is formed in a direction perpendicular to the axis of the drive 2. The supporting hole 4 is engaged with a steel ball 6 which is partly protruded from the afore-mentioned peripheral side under the effect of a coiled spring 5.

More specifically, the steel ball 6 is engaged with the supporting hole 4 of the drive 2, and the supporting hole 4 has an opening end part 4*a*, the diameter of which is smaller than that of the steel ball 6. Owing to such a structural feature of this opening end part 4*a* as having a smaller diameter, the steel ball 6 is prevented from escaping from the drive 2. The coiled spring 5 is interposed between the steel ball 6 and a rear wall 4*b* of the supporting hole 4. Under the effect of this coiled spring 5, a part of the steel ball 6 is normally protruded from the opening end part 4*a* (the peripheral side of the drive 2) when the steel ball 6 is in engagement with the supporting hole 4.

The wrench body 3 has a short cylindrical body having a large outer diameter at one side in the axial direction thereof and a small outer diameter at the other side. An assembling hole 7 having a rectangular configuration in section is formed in an end face 3*a* on the other side having the small outer diameter, and a connecting square hole 8 having a hexagonal configuration in section is formed in an end face 3*b* on the afore-mentioned one side having the large outer diameter. For use, the drive 2 is inserted and fit to the assembling hole 7 and a hexagonal head b' or hexagonal nut (not shown) is engaged with the assembling hole 7.

The assembling hole 7 is provided at an inner wall 7*a* for allowing the steel ball 6 assembled with the drive 2 contacts therewith when the drive 2 is fit to the assembling hole 7, so that the connecting relation between the assembling hole 7 and the drive 2 can be maintained by the engaging relation between the steel ball 6 and the recess part 9. In this way, the operating handle 1 is assembled with the wrench body 3, thereby constituting the socket wrench A.

The recess part 9 is defined by a curved contacting wall 9*a* of a small arc which is disposed at the end face 3*a* side and a curved contacting wall 9*b* of a large arc which is disposed at the end face 3*b* side. The walls 9*a* and 9*b* are disposed slantwise in mutually intersecting directions so that the contacting walls 9*a* and 9*b* gradually come closer to each other as they come closer to the mutually continuous rear end. The opening end of the recess part 9 has a somewhat elliptical shape that is long in the direction intersecting with the axis of the wrench body 3. The steel ball 6 is brought into contact with the contacting surfaces 9*a* and 9*b* such that a part of the steel ball 6 is in engagement between the contacting walls 9*a* and 9*b*.

In this embodiment, the contacting walls 9*a* and 9*b* each have a curved surface. However, it should be understood that the curved surface is necessary only for enhancing the easy machining of the recess part 9 with respect to the drive 2 and that they can take any other form as long as one side thereof is slanted such that the steel ball can contact the slanted surface.

Likewise, in this embodiment, the recess part 9 is disposed at the four inner walls 7*a*, 7*a*, 7*a* and 7*a* of the assembling hole 7 having a square shape in section, so that there is no need to select the directionality when the drive 2 is engaged. However, it should be understood that the recess part 9 is not necessarily disposed at the four inner walls 7*a*, 7*a*, 7*a* and 7*a* and that it may be disposed at only one inner wall 7*a*.

When the drive 2 is inserted into the assembling hole 7, the steel ball 6 is brought into contact with the inner wall 7*a* of the assembling hole 7. Then the steel ball 6 is pressed and caused to retreat by the inner wall 7*a* toward the rear wall 4*b* within the supporting hole 4 against the biasing force of the coiled spring 5. With the steel ball 6 held in the retreated position, when the drive 2 is moved within the assembling hole 7 and brought to the recess part 9 position of the assembling hole inner wall 7*a*, the steel ball 6 which is biased by the coiled spring 5 in the direction protruding from the supporting hole 4, i.e., toward the opening end part 4*a* is freed from the restriction against the coiled spring 5 by the inner wall 7*a* and protruded from the supporting hole 4 and engaged with the recess part 9. Thus, the operating handle 1 and the wrench body 3 are mutually assembled and functioned as the socket wrench A.

Then, when connecting square hole 8 of the wrench body 3 is externally fitted to the head part b' of the bolt b to be operated and the operating handle 1 is turned in the normal or reverse direction utilizing a ratchet mechanism (this ratchet mechanism may be eliminated in the present invention), the head part b' is turned in the selected direction to tighten or loosen the bolt b.

What is claimed is:

1. A socket wrench comprising an operating handle, a drive attached to said operating handle and having a supporting hole, a steel ball pressed by a spring and movably engaged in said supporting hole, a wrench body having an assembling hole for allowing said drive to engage therein, a recess part for allowing said steel ball to partly engage therein being formed in said assembling hole of said wrench body, a connecting hole engageable with a polygonal head part of a bolt to be operated being formed in said wrench body in such a manner as to be coaxial with said drive, said recess part having a pair of contacting walls for allowing said steel ball to contact therewith, said pair of contacting walls being disposed in mutually intersecting directions, one of said pair of contacting walls being formed with a curved surface of a large arc on a side of said recess part more distant from said operating handle, the other of said pair of contacting walls being formed with a curved surface of a small arc on a side of said recess part nearer said operating handle, and an opening end of said recess part being formed in one plane and having an elliptical shape in a direction intersecting with an axis of said wrench body.

* * * * *